United States Patent [19]

Ishikawa et al.

[11] Patent Number: 4,911,351

[45] Date of Patent: Mar. 27, 1990

[54] METHOD OF MANUFACTURING HEAT-EXCHANGER

[75] Inventors: Kazunori Ishikawa; Shigenori Asami, both of Nikko, Japan

[73] Assignee: Furukawa Aluminum Co., Ltd., Tokyo, Japan

[21] Appl. No.: 357,673

[22] Filed: May 30, 1989

Related U.S. Application Data

[63] Continuation of Ser. No. 219,544, filed as PCT JP87/00886 on Nov. 16, 1987, published as WO88/03851 on Jun. 2, 1988, abandoned.

[30] Foreign Application Priority Data

Nov. 17, 1986 [JP] Japan .................. 61-273175
May 28, 1987 [JP] Japan .................. 62-132660
Jun. 12, 1987 [JP] Japan .................. 62-146501
Sep. 4, 1987 [JP] Japan .................. 62-221574

[51] Int. Cl.⁴ .................. B23K 1/20; C23C 14/16; C23C 14/24
[52] U.S. Cl. .................. 228/183; 228/263.17; 148/272; 427/310
[58] Field of Search .................. 228/183, 217, 263.17; 165/133, 134.1; 427/310; 148/272

[56] References Cited

U.S. PATENT DOCUMENTS 4,645,119 2/1987 Haramaki et al. .................. 228/183

FOREIGN PATENT DOCUMENTS 53-94230  8/1978  Japan .
54-120448 9/1979  Japan .
55-48590 12/1980  Japan .
32872    2/1982  Japan .
56679   12/1982  Japan .................. 165/133
86899    5/1984  Japan .................. 165/134.1
59-31588 8/1984  Japan .
15065    1/1985  Japan .
21176    2/1985  Japan .................. 228/183
130463   7/1985  Japan .

Primary Examiner—Kenneth J. Ramsey
Attorney, Agent, or Firm—Armstrong, Nikaido, Marmelstein, Kubovcik & Murray

[57] ABSTRACT

A method of manufacturing heat-exchanger excellent in the pitting corrosion resistance is disclosed, wherein, in the manufacture of aluminum heat-exchanger to be brazed under heat in the furnace of inert gas atmosphere using fluoride flux, Zn is disposed at a position of 430° to 620° C. in the furnace to melt and vaporize it and the vapor of Zn is allowed to contact with the fin material and the tube material coated with said flux simultaneously with the brazing under heat of these aluminum components, or the fin material coated with said flux and dried and the tube material without flux are assembled and retained for not less than 1 minute in the vapor of Zn of a temperature lower than the melting point of said flux and higher than the temperature, at which these components are heated, in the inert gas and thereafter brazing is performed at a temperature higher than the melting point of said flux.

3 Claims, 2 Drawing Sheets

METHOD OF MANUFACTURING HEAT-EXCHANGER

This application is a continuation application Ser. No. 219,544 filed as PCT JP87/00886 on Nov. 16, 1987, published as WO88/03851 on Jun. 2, 1988, now abandoned.

FIELD OF THE TECHNOLOGY

The present invention relates to a method of a manufacturing aluminum heat-exchanger excellent in the pitting corrosion resistance, a method of concentrating Zn on the surface layer of Al components and a method of generating the vapour of Zn for the concentration of surface Zn. In particular, the invention is applicable to the brazing of a heat-exchanger for motorcars.

BACKGROUND OF THE TECHNOLOGY

Recently, for the radiator, evaporator and condenser of air-conditioner, etc. as the heat-exchanger for motorcars, Al or Al alloys have become to be used broadly for the lightening in weight. In general, for the manufacture of aluminum heat-exchanger, a brazing sheet laminated with brazing alloy having a lower melting point than the core material, for example, Al-Si alloy or Al-Si-Mg alloy onto one or both sides of core material comprising Al or Al alloy is used. This is combined with Al component, for example, extruded multihole tube to permit the mass production by brazing.

For such aluminum heat-exchangers manufactured by the heating for brazing, following methods are used to assure the pitting corrosion resistance.

(1) Chloride flux containing $ZnCl_2$ is used for the heating for brazing and Zn is allowed to deposit and diffuse onto the surface of Al components simultaneously with the brazing. The pitting corrosion of Al components is prevented through the sacrificial action of said diffuse layer. This method is excellent in the pitting corrosion resistance and utilized mainly for the condenser or cooler.

(2) Such elements as make Al or Al alloys base electrochemically when adding Zn, Sn, In, etc. are added to fin material or brazing material. Through the sacrificial action thereof, the pitting corrosion of Al components constructing the passage of refrigerant etc. is prevented. This method is utilized mainly for the condenser, evaporator, radiator, etc.

(3) Al-Zn alloy, Al-Zn-Mg alloy or pure Al is used as a skin material and this is cladded to various core materials to prevent the generation of pitting corrosion of core material through the sacrificial action of skin material. This method is utilized for the improvement in the pitting corrosion resistance of tube (seam welded tube), header, etc. of radiator, in particular, for the water side thereof.

(4) To the extruded multihole tube used for the condenser tube, a layer covered with Zn is provided beforehand by flame spray coating with Zn, zincate treatment, Zn plating, etc. Then, the diffuse layer of Zn is formed by the heating for brazing to prevent the pitting corrosion of extruded multihole tube.

All of conventional methods above to assure the corrosion resistance of aluminum heat-exchanger have following problems and the improvement therein is desired earnestly.

In the method (1) above, the post-treatments such as washing with water etc. becomes necessary because of the occurrence of corrosive flux residue and the production cost including the effluent treatment etc. accompanied with this becomes high. In the method (2) above, there is a restriction in the range of corrosion resistance of fin material and the effect of application thereof does not extend all over the core of heat-exchanger. In the method of adding to brazing material, the sacrificial layer cannot be formed sufficiently due to the melting of brazing material and, inversely, at a portion where the brazing material builds up, the sacrificial layer often comes into the core material deeply together with the diffusion of brazing material to lower the pitting corrosion resistance. In the method (3) above, the sacrificial layer must be cladded beforehand and the application is difficult to the extruded multihole tube etc., though the production is possible with the brazing sheet. Also, in the method (4) above, the surface of Al component becomes heterogeneous by the treatment with Zn resulting in the problems such as dropping out etc. due to the bending etc.

With regard to the method (1), a brazing method used the non-hygroscopic and noncorrosive fluoride flux has been developed thereafter. In this method, the eutectic composition of, for example, $KAlF_4$-$K_3AlF_6$ is used for the flux and the brazing is performed by heating to about 600° C. in the furnace, where the dew point is controlled not higher than $-40°$ C. and the partial pressure of $O_2$ is controlled not more than 1000 ppm, introducing the inert gas, mainly $N_2$ (hereinafter, such brazing method as this is referred to as NB method). Here, the washing after the brazing is unnecessary.

For example, in the case of the condenser of aluminum heat-exchanger by NB method, the extruded multihole tube (hereinafter, abbreviated as tube material) (1) processed with bender in a serpentine shape as shown in FIG. 1 (A) and the fin material (2) corrugated as shown in FIG. 1 (B) are assembled as shown in FIG. 1 (C). After fitted the unions (3) and (3') to the inlet and outlet of the refrigerant in tube material (1), respectively, this is fixed with pressing-down jigs (4) to make the core (5). Following the washing of said core, fluoride type flux is coated all over it and then this is fed to the brazing furnace to preheat and heat according to the temperature distribution curve shown in FIG. 3 (B). Thus, the fin material and the tube material are brazed and united.

For the fin material, the brazing sheet (thickness: 0.16 mm) laminated with JIS 4343 Al-Si alloy as a brazing material onto both sides of the core material comprising JIS 3003+1% Zn alloy is used. However, resulting from the traveling of motorcars in the areas of salt damage, the improvement in the exterior pitting corrosion resistance of said heat-exchanger has become an important problem recently. Particularly, in the NB method aforementioned, not only the use of sacrificial fin but also the corrosion-resistant treatment of tube material itself as below have become to be made.

(1) By submitting the tube material to the zincate treatment before brazing, Zn is allowed to deposit onto the surface of tube material and, by the heating for brazing, Zn is allowed to diffuse into tube material.

(2) By adding Zn to the fluoride flux, Zn is allowed to diffuse from flux into tube material upon heating for brazing.

However, the zincate treatment before brazing brings about high cost and, at the same time, since alkali solution is used for the zincate treatment of tube material, the invasion of the solution into tube material must be prevented resulting in many difficulties in the operation.

Moreover, in the method adding Zn to the flux, low concentration flux of about 10% is used satisfactorily in the case of fluoride flux due to the strong activity by itself on the contrary to the use of high concentration flux of 50 to 60% in the case of chloride flux. As a result, large amounts of Zn cannot be supplied and desired amount of Zn cannot be allowed to diffuse all over the surface.

On the other hand, a method is shown in Japanese Patent Publication No. Sho 59-31588, wherein the vapour of Zn is blown onto the surface of extruded material of Al to form a layer covered with Zn, this is allowed to diffuse onto the surface of extruded material of Al by the heatings for brazing etc., and the corrosion resistance is improved through the sacrificial effect of surface layer. The generation of the vapour of Zn in this case is performed in such a way that the gas-introductory pipe is inserted into the melt of Zn kept at 550° C., the vapour of Zn is allowed to disperse into $N_2$ gas being a carrier by supplying $N_2$ gas to bubble, and the vapour of Zn is blown onto the surface of extrusion-moulded material of Al via the passage kept hot to form the layer covered with Zn on the surface of extrusion-moulded material of Al. The thickness of the layer covered with Zn is adjusted by the extruing velocity of extrusion-moulded material and the supplying amount of gas.

However, with the extrusion-moulded material of Al, the blowing of the vapour of Zn is easy inside the extruded material, but, on the outside, the vapour of Zn ends to scatter around and further the oxidation proceeds in the air. Therefore, it is difficult to provide the uniform layer of Zn for a short time. Moreover, with the aluminum heat-exchanger used the brazing sheet, the blowing of the vapour of Zn is difficult at the time of manufacturing the brazing sheet material because of the large width of plate to make the application impossible. Furthermore, since $N_2$ gas is bubbled as a method of generating the vapour of Zn, the facility for supplying $N_2$ gas under high pressure, the furnace for retaining the melt of Zn and the pipings are needed.

DISCLOSURE OF THE INVENTION

As a result of extensive investigations in view of this situation, a method of manufacturing aluminum heat-exchanger wherein Zn is allowed to diffuse onto the surface of Al components to be brazed simply and inexpensively by the NB brazing method to improve the pitting corrosion resistance, a method of concentrating zinc on the surface layer of Al components wherein Zn is allowed to concentrate uniformly at each portion by a simple method without affecting on the brazing in all steps including the step of material, the step of brazing, the step after brazing, etc. to permit the improvement in the pitting corrosion resistance and a method of generating the vapour of Zn for the concentration of surface Zn of Al components wherein the covering with the vapour of Zn and the diffusion of Zn are performed simultaneously with the brazing through the efficient generation of the vapour of Zn have been developed by the invention.

SUMMARY OF THE INVENTION

The first object of the invention is to provide the method of manufacturing heat-exchanger characterized in that, in the manufacture of aluminum heat-exchanger to be brazed under heat in the furnace of inert gas atmosphere using fluoride flux, Zn is disposed at a position of 430° to 620° C. in the furnace to melt and vapourize it and the vapour of Zn is allowed to contact with the fin material and the tube material coated with said flux simultaneously with the brazing under heat of these Al components to diffuse Zn.

Further, the second object of the invention is to provide the method of manufacturing heat-exchanger characterized in that, in the manufacture of heat-exchanger as described above, the fin material coated with fluoride flux and dried and the tube material without flux are assembled and retained for not less than 1 minute in the vapour of Zn of a temperature lower than the melting point of said flux and higher than the temperature, at which these components are heated, in the inert gas and thereafter the brazing is performed at a temperature higher than the melting point of flux.

The third and the fourth object of the invention relates to the method of concentrating Zn on the surface layer of said Al components and the method of generating the vapour of Zn for the concentration of surface Zn, respectively.

In the first method of manufacturing heat-exchanger in accordance with the invention, after coated with fluoride flux onto the Al components for heat-exchanger, this is heated and dried at about 200° C. in the preheating zone. Then, the brazing is performed by heating for several minutes at 600° C. (real temperature) in the brazing zone in the inert gas atmosphere. At this time, Zn is placed at a position where the temperature in the furnace becomes to 430° to 620° C. to melt and vapourize and the Al components are allowed to contact with the vapour of Zn generated simultaneously with the brazing under heat of Al components to diffuse Zn.

Although the Al-Si brazing material melts near 577° C., the diffusion of Zn proceeds from a temperature lower than this regardless of the situation of flux (before or after melting) adhered to the surface, and the diffusion of Zn into Al components occurs simultaneously with the brazing of Al components. The situation of the diffusion of Zn depends on the generating situation of the vapour of Zn.

Here, the reason why Zn is disposed at a position of 430° to 620° C. in the furnace to melt and vapourize is due to that the generation of the vapour of Zn is unreasonable unless above the melt temperature of Zn (430° C.) and it is necessary to keep Zn above this temperature. On the other hand, in order to allow the diffusion of Zn to occur simultaneously with the brazing, the upper limit temperature is 620° C. Moreover, the concentration of oxygen in the inert gas atmosphere inside the furnace is made not more than 1000 ppm and the dew point is made not higher than −30° C. These are because of that, if out of these ranges, not only good brazing cannot be obtained, but also the generating efficiency of the vapour of Zn is lowered.

The flow rate of inert gas is suitable to be one tenth of the effective inner volume of furnace to equal to it per minute. If under the lower limit, the concentration of oxygen and the dew point cannot be maintained within said ranges and, if over the upper limit, the consumption of inert gas increases and the generation of the vapour of Zn also increases to make the diffusion excessive leading to the lowering in the corrosion resistance.

Further, the surface area of the melt of Zn is desirable to be 0.05 to 2.5 $cm^2$ per effective unit inner volume (liter) of furnace, thereby the generation of the vapour of Zn and the efficient diffusion become possible.

Besides, for the uniform diffusion of Zn into Al components, it is important to make the contact of Al components with the vapour of Zn uniform. For this reason, appropriate agitation is desirable as well as the gas flow.

In the second manufacturing method of the invention, the reason why the flux is coated onto only the fin material is due to that, if the flux is coated beforehand onto the tube material, too, the flux acts as a barrier film to hinder the adherence of the vapour of Zn to the surface of tube material when exposing to the vapour of Zn and allowing Zn to diffuse into the tube material after assembled with tube material. Also, the reason why the heating of these assembled components in the inert gas and the exposure to the vapour of Zn are practised at a temperature lower than the melting point of said flux is for the avoidance of the fact that the flux coated onto the fin material melts and covers the surface of tube material during the diffusion of Zn into tube material.

Moreover, in order to allow Zn to adhere efficiently from the vapour of Zn to the surface of tube material before the melting of fluoride flux, the temperature of the vapour of Zn is optimal to be 550° to 560° C. which is higher than the heating temperature of tube material and lower than the melting point of flux (about 562° C.). If the retaining time is under 1 minute, the amount of Zn adhering to the surface of tube material is insufficient and thus the corrosion-preventive effect is also unsatisfactory. Besides, when lowering said temperature of the vapour of Zn, the retaining time is necessary to be lengthened depending thereon.

Furthermore, in order to carry out the generation of the vapour on Zn efficiently in the brazing furnace, the concentration of oxygen in the furnace and the dew point are desirable to be made not more than 1000 ppm and not higher than −30° C. similarly to the case of said first manufacturing method wherein the diffusion of Zn is performed simultaneously with the brazing under heat. The flow rate of the inert gas per minute is optimal and economic to be one tenth of the volume of furnace to equal to it for the maintenance of the atmosphere in furnace and the generation of the vapour of Zn, and the surface area of the melt of Zn in the furnace is also effective to be made 0.05 to 2.5 cm$^2$ per unit volume (liter) of the furnace.

The invention provides the general method of concentrating Zn on the surface layer of Al components when heating Al or Al alloy components in the vapour of Zn as the third object thereof. In this method, the vapour of Zn may be generated by heating Al or Al alloy components and Zn simultaneously in the furnace or the vapour of Zn generated by heating Zn in a different apparatus may be used. The treatment temperature would be out of the question if over the melting temperature of Zn (about 420° C.), and the higher the temperature, the larger the surface concentration and the diffusion depth. The treatment time also affects on the diffusion pattern of Zn on the surface of components similarly. The atmosphere for the treatment is desirable to be of the inert gases such as N$_2$ gas etc., but the concentration of Zn is possible even in the air. The pressure is sufficient near the atmospheric pressure, or the vapour of Zn may be generated in vacuum.

For allowing Zn to diffuse at the step of the materials of Al or Al alloy components, they are passed through the furnace held the vapour of Zn therein at the time of hot processing (rolling or extrusion), or the vapour of Zn may be sprayed from nozzles. The change in the surface properties due to the deposition of Zn is quitely out of the question and there is no restriction in the shape of materials. For example, when applying at the step of brazing of Al components, an appropriate amount of the melt of Zn may be placed in the brazing furnace. Zn diffuses also onto the surface of brazing material without question.

When heating Zn above the melting temperature and heating Al or Al alloy components in the vapour of Zn generated, Zn diffuses from the surface to the inner portion of Al or Al alloy components to give the sacrificial effect to said components. The diffusion of Zn shows such diffusion pattern that the surface is highest in the concentration and the pitting corrosion resistance becomes best. The diffusion of Zn is not affected by the flux even in the brazing used the fluoride flux. Also, by carrying out the treatment of the invention at a lower temperature than the melting point of brazing material after the brazing of Al or Al alloy components, Zn can be allowed to diffuse uniformly onto the surface. This is true, for example, when the core of heat-exchanger is manufactured by vacuum brazing and this core is submitted to the treatment of the invention. Further, by applying to Al-Mg alloy etc., the surface layer can be alloyed to Al-Mg-Zn to improve the strength of alloy.

The method of generating the vapour of Zn for the concentration of surface Zn of Al components, which is the fourth object of the invention, is applied to the NB method wherein Zn is placed in the heating furnace, N$_2$ gas being flown therethough as a carrier gas, Zn and the atmosphere in the furnace are heated above 430° C. to melt Zn, and the vapour of Zn is allowed to generate from the melt of Zn. The conditions are characterized in that, when the inner volume of the heating furnace is put as V liters, the amount of the melt of Zn, the surface area of the melt of Zn and the flow rate of N$_2$ gas are made 1 to 10 g/liter, 0.05 to 2.5 cm$^2$/liter and 0.05 V to V liter/min, respectively, and the atmosphere in the heating furnace is retained so as the dew point and the concentration of oxygen to become not higher than −20° C. and not more than 1000 ppm, respectively, in the vicinity of atmospheric pressure to allow the vapour of Zn to generate from the melt of Zn.

The reason why Zn and the atmosphere in the furnace are heated above 430° C. is because of that, for the vapourization of Zn in the atmosphere of N$_2$ under atmospheric pressure, it is necessary to maintain Zn in sufficient molten state. The amount of Zn vapourized increases as the temperature becomes high, but, for the concentration of Zn on the surface of Al components simultaneously with the NB brazing, it is desirable to maintain the temperature of Zn and the atmosphere in the furnace at 430° to 600° C.

Next, the reason why the amount of the melt of Zn is made 1 to 10 g/liter when the inner volume of the heating furnace to be used for the generation of vapour is put as V liters is because of that, if the amount of the melt of Zn is under 1 g/liter, the inside of the furnace cannot be filled up with the vapour of Zn and the contact of the vapour of Zn with Al components becomes insufficient resulting in the incapability of the appropriated diffusion of Zn, and, if over 10 g/liter, excessive diffusion pattern is realized when performing the vapour treatment of Al components with Zn together with the saturation of the vapour of Zn. Also, the reason why the surface area of the melt of Zn is made 0.05 to 2.5 cm$^2$/liter is because of that, if under 0.05 cm$^2$/liter, the inside of the furnace cannot be filled up with the vapour of Zn and, if over 2.5 cm²/liter, the consumption of the vapour of Zn becomes violent and the efficiency is worsened for the continuous generation of the vapour of Zn.

Further, the reason why the flow rate of $N_2$ gas is made 0.05 V to V liters/min is because of that, if under 0.05 V liters/min, the vapourization of Zn becomes insufficient and, if over 1 V liter/min, the consumption of Zn becomes significant. The flow rate of $N_2$ at the time of NB brazing would be out of the question even if allowed to flow in amounts of 30 to 60 m³/hr or so (when using continuous furnace with an inner volume of about 2000 liters). From this fact, the vapour of Zn can be generated by placing the melt of Zn in the NB brazing furnace as well as the generation in a different furnace. Moreover, the reasons why the atmosphere in the heating furnace is made so as the dew point and the concentration of oxygen to become not higher than $-20°$ C. and not more than 1000 ppm, respectively, in the vicinity of atmospheric pressure are for the prevention of the surface of the melt of Zn from oxidation and for the efficient generation of the vapour of Zn, and, for $N_2$ gas, liquid $N_2$ is vapourized to use. Taking the use of $N_2$ gas even in the NB brazing into consideration, the use of $N_2$ gas is most suitable. Since the conditions fo the atmosphere necessary for the NB brazing are that the dew point is below $-30°$ C. and the concentration of oxygen is below 1000 ppm even in the case of placing Zn in the NB brazing furnace, Zn can be vapourized without oxidation.

By keeping the conditions as described above while allowing the vapour of Zn to generate from the melt of Zn, the efficient diffusion of Zn onto the surface of Al components becomes possible. Besides, in order to remove the initial oxidation film of the melt of Zn, it is effective to melt the metal of Zn in the atmospheric furnace after the acid pickling. Moreover, the mechanical removal of the film on the surface of the melt of Zn in the heating furnace is also effective for the enhancement of the generation rate of the vapour of Zn.

BEST EMBODIMENTS FOR PRACTISING THE INVENTION

Example 1 through 9 and Comparative example 1 through 4

Figure 1A:
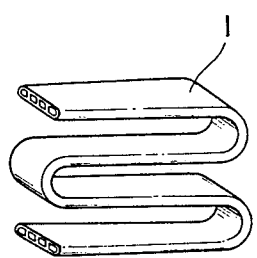
FIGS. 1 (A), (B) and (C) show the assembling of the core of aluminum heat-exchanger, wherein (A) is an oblique diagram of the extruded tube material processed with bender, (B) is an oblique diagram of the fin material corrugated, and (C) is an oblique diagram of the core assembled by pressing down with jigs.
Figure 1B:
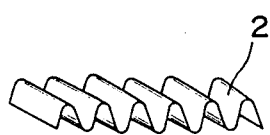
Figure 1C:
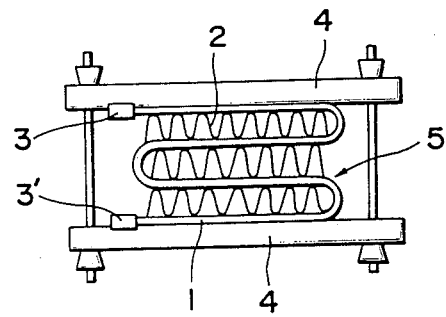

Employing a continuous atmospheric furnace with a length of 9 m, a frontage of muffle of 300 mm, a height of 100 mm and a volume of 270 liters and a drying furnace, the brazing of a condenser core with an outer size of 70×200 mm was carried out. For the tube (1), four-hole extruxion-moulded material with a thickness of 5 mm and a width of 22 mm which comprises JIS 1050 alloy and which is shown in FIG. 1 (A) was used and bent. Moreover, for the fin (2), a brazing sheet cladded with JIS 4343 alloy as a brazing material onto both sides of core material comprising JIS 3003 alloy (thickness of plate: 0.16 mm, cladding ration with brazing material: 10%) was used and corrugated (FIG. 1 (B)). These tube (1) and fin (2) were disposed so that fin (2) was interposed between portions of tube (1) as shown in FIG. 1 (C) and fixed with jigs. After degreasing, the fluoride flux at a concentration of 5 wt. % was coated and the moisture was removed in the drying furnace of 200° C. This was placed in the continuous atmospheric furnace for brazing.

The continuous atmospheric furnace consists of preheating zone, brazing zone and cooling zone. The preheating zone was kept at 350° C., the brazing zone was kept at 550° C. and 600° C., and the cooling zone was made possible to be cooled to 300° C. or so by water-cooling jacket structure. Through the furnace, $N_2$ gas was flown. In this way, making the times to be retained in the furnace and in the brazing zone 20 and 15 minutes, respectively, and placing a vessel with a surface area of 10 to 800 cm² in which the molten Zn was accommodated at a position of brazing zone kept at 550° C., the diffusion of Zn was performed simultaneously with the brazing under a flow rate $N_2$ gas of 20 to 350 liters/min. Of these cores, the situation of the diffusion of Zn was examined and, at the same time, CASS test was conducted for 500 hours. The results are shown in Table 1.

The situation of the diffusion of Zn was shown by the average value determined at five points for each core with X-ray microanalyser (EPMA). Moreover, in the CASS test, after removed the corrosion products, maximum depth of pit was determined by the method of depth of focus.

TABLE 1

| Manufacturing method | No. | Surface area of melt of Zn cm² | (cm²/l) | Flow rate of $N_2$ l (times/min) | | Dew Point (C.°) | Concentration of $O_2$ (ppm) | Situation of diffusion of Zn Concentration of surface Zn (wt. %) | Depth of diffusion (μm) | Pit depth (by CASS test) (μm) |
|---|---|---|---|---|---|---|---|---|---|---|
| Method of the invention | 1 | 15 | (0.05) | 30 | (0.11) | −31 | 700 | 2.1 | 110 | 110 |
| Method of the invention | 2 | 50 | (0.18) | 30 | (0.11) | −31 | 700 | 2.3 | 110 | 110 |
| Method of the invention | 3 | 100 | (0.37) | 135 | (0.5) | −40 | 350 | 3.1 | 115 | 110 |
| Method of the invention | 4 | 100 | (0.37) | 240 | (0.89) | −45 | 200 | 5.7 | 120 | 120 |
| Method of the invention | 5 | 350 | (1.30) | 135 | (0.5) | −40 | 350 | 6.3 | 115 | 110 |

TABLE 1-continued

| Manufacturing method | No. | Surface area of melt of Zn cm² | (cm²/l) | Flow rate of N₂ l (times/min) | | Dew Point (C.°) | Concentration of O₂ (ppm) | Situation of diffusion of Zn Concentration of surface Zn (wt. %) | Depth of diffusion (μm) | Pit depth (by CASS test) (μm) |
|---|---|---|---|---|---|---|---|---|---|---|
| Method of the invention | 6 | 500 | (1.85) | 50 | (0.19) | −35 | 500 | 4.1 | 120 | 120 |
| Method of the invention | 7 | 500 | (1.85) | 200 | (0.74) | −43 | 250 | 7.5 | 150 | 140 |
| Method of the invention | 8 | 650 | (2.41) | 100 | (0.37) | −38 | 400 | 5.5 | 140 | 140 |
| Method of the invention | 9 | 650 | (2.41) | 240 | (0.89) | −45 | 200 | 9.5 | 160 | 140 |
| Comparative method | 1 | 10 | (0.03) | 100 | (0.37) | −39 | 400 | 1.0 | 110 | 170 |
| Comparative method | 2 | 500 | (1.85) | 20 | (0.07) | −25 | 900 | 2.0 | 110 | 110 |
| Comparative method | 3 | 700 | (2.59) | 135 | (0.5) | −40 | 350 | 13.0 | 200 | 200 |
| Comparative method | 4 | 500 | (1.85) | 300 | (1.11) | −47 | 150 | 12.0 | 190 | 200 |

As evident from Table 1, in all cases of the method of the invention No. 1 through 9, the diffusion patterns of Zn with a concentration of surface Zn of 2.1 to 9.5% and a depth of diffusion of Zn of 110 to 160 μm were formed on the surfaces of tube, and, in the corrosion test according to CASS, too, excellent pitting corrosion resistances were recognized.

Whereas, in the case of comparative method No. 1 different in the conditions, the concentration of surface Zn was low and the pitting corrosion resistance was poor because of the small surface area of the melt of Zn and, in the case of comparative method No. 2, the dew point was high and the brazing of fin material was partially insufficient. Moreover, since the surface area of the melt of Zn is large in comparative method No. 3 and the flow rate of N₂ is high in comparative method No. 4, it was seen in all cases that the concentration of surface Zn was high, the diffusion was deep, and the deep pitting corrosion was generated.

Example 10 through 17 and Comparative example 5 through 9

The fin material (2) was made by corrugating a brazing sheet with a plate thickness of 0.16 mm which was cladded with a brazing material of JIS 4343 alloy (6.8–8.2% Si-Al alloy) onto both sides of a core material of JIS 3003 alloy (0.05–0.2% Cu-1.0–1.5% Mn-Al alloy) in a cladding ratio of 10%. This was dipped into a solution of 5% concentration of fluoride flux after washing with solvent and then dried through the drying furnace of 200° C. to coat the flux onto the surface. Said fin material (2) and the four-hole tube material (1) with a wall thickness of 0.8 mm, a width of 22 mm and a thickness of 5 mm, which was obtained by extruding JIS 1050 alloy (Al: above 99.5%) and thereafter processed with bender and washed with solvent, were pressed down with pressing jigs (4) as in FIG. 1 (C) to use for the brazing sample as a core (5) not fitted with unions. Such core was submitted to the brazing test by NB method in the furnace as below.

Figure 2:
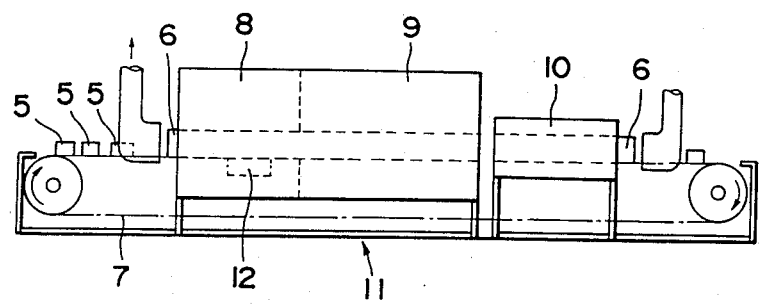
FIG. 2 is a diagram of the external appearance showing the continuous atmospheric furnace.

As shown in FIG. 2, an endless mesh belt (7) running through the muffle (6) with a width of frontage of 300 mm, a height of frontage of 100 mm and a length of 9 m (effective inner volume: 270 liters) is furnished, and the preheating zone (8) which preheats the core (5) mounted on the belt (7) from a position of this side in the direction of travel of said belt (7) and transferred by said belt (7), the brazing zone (9) brazing said core (5) and the cooling zone (10) cooling the brazed article are provided in the continuous atmospheric furnace (11). Through the muffle (6) of said furnace (11), N₂ gas amounting 30 liters/min was flown, the inside of brazing zone (9) was established at 600° C., and the vessel of Zn (12) with a surface area of 50 cm² accommodated the melt of Zn was placed in the preheating zone (8).

Figure 3:
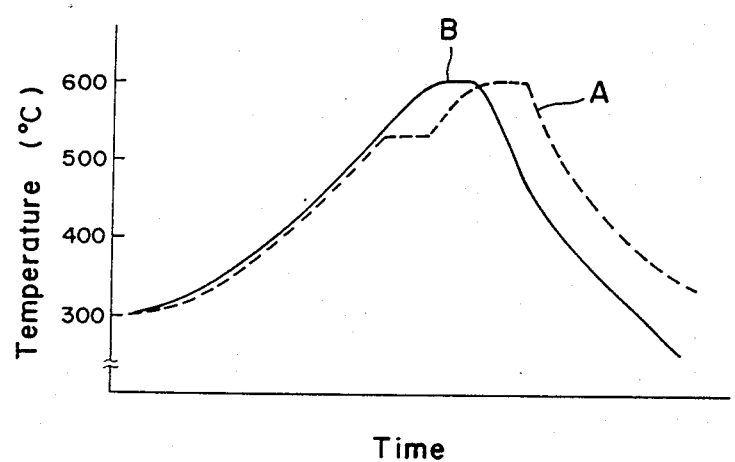
FIG. 3 is a graph showing the temperature distribution curve in the furnace when brazing in the continuous atmospheric furnace.

In such continuous atmospheric furnace, the preheating temperature and the preheating time in the preheating zone for the diffusion of the vapour of Zn onto the tube of said core were varied as shown in Table 2 and said core was brazed according to the temperature distribution curve in furnace as shown by (A) in FIG. 3. Then, the concentration of surface Zn and the depth of the diffusion of Zn into the tube material of core obtained under respective conditions were determined at five points, respectively, by the use of EPMA. These results are put down in Table 2. Besides, the dew point and the concentration of oxygen in the atmosphere inside the furnace upon brazing were −35° C. and 100 ppm, respectively. Further, of the cores thus obtained, CASS test for 500 hours was conducted and the maximum depth of pit at that time was determined by the method of depth of focus. The results are also put down in Table 2.

Moreover, for comparison, of the cores manufactured by the method, wherein, after coated with the flux all over said core, this was brazed at 600° C. according to the temperature distribution curve in furnace shown by (B) in FIG. 3 placing the melt of Zn in the preheating zone in the continuous atmospheric furnace aforementioned, similar tests were carried out, the results of which are put down in Table 2.

TABLE 2

| Manufacturing method | No. | Preheating temperature (°C.) | Preheating time (min) | Concentration of surface Zn (wt %) | Depth of diffusion of Zn (μm) | Depth of pit (mm) |
|---|---|---|---|---|---|---|
| Method of the invention | 10 | 450 | 3 | 1.1 | 120 | 0.12 |
| Method of the invention | 11 | " | 5 | 1.7 | 130 | 0.13 |
| Method of the invention | 12 | 500 | 1 | 1.2 | 110 | 0.11 |
| Method of the invention | 13 | " | 3 | 1.3 | " | 0.10 |
| Method of the invention | 14 | " | 5 | 1.5 | 130 | 0.11 |
| Method of the invention | 15 | 550 | 1 | 1.4 | 100 | 0.10 |
| Method of the invention | 16 | " | 5 | 1.7 | 130 | 0.12 |
| Method of the invention | 17 | 560 | 1 | 1.6 | 110 | 0.11 |
| Comparative method | 5 | 550 | 0.5 | 0.7 | 90 | 0.23 |
| Comparative method | 6 | 570 | 1 | " | 50 | 0.25 |
| Comparative method | 7 | " | 3 | " | 60 | 0.32 |
| Comparative method | 8 | 575 | 3 | " | 50 | 0.33 |
| Comparative method | 9 | — | — | 0.3 | " | Perforated (>0.8) |

As evident from Table 2, with the cores according to the method of the invention Nos. 10 through 17, the concentration of surface Zn was as high as 1 to 2% and the depth of diffusion was also about 100 μm showing good diffusion patterns. Further, even directly under the fin, that is, on the surface of tube material the brazed portion, similar diffusion patterns were recognized. Moreover, the depth of pit by CASS test was seen to be excellent. On the other hand, in the cases of comparative method No. 5 wherein the preheating time is under 1 minute and comparative method Nos. 6 through 8 wherein the preheating temperature is higher than the melt temperature of flux, good diffusion patterns could not be obtained and further the depth of pit was also seen to be two to three times as deep as the case of the invention. Moreover, in the case of comparative method No. 9 wherein, after coated with the flux all over, brazing was made passing through the vapour of Zn, the concentration of diffused Zn was low and the corrosion-resistant effect was markedly poor. From this, it can be seen that the flux on the surface of tube suppresses the adherence of Zn.

Besides, even when the core coated with flux onto the fin alone is brazed by raising the temperature continuously as (B) in FIG. 3 or even when the generation sources of Zn are arranged at several points in the furnace kept at a temperature lower than the melting point of flux (about 562° C.), similar effect to the invention can be obtained.

EXAMPLE 18

A condenser tube (outer size: 5×22 mm, 4 holes, wall thickness: 0.8 mm) for the air-conditioner of motorcars, which comprises JIS 1050 (pure Al with a purity of above 99.5 wt. %), was extruded at 500° C., retained immediately thereafter for 1 minute at 600° C. in the atmospheric furnace of $N_2$ placed the melt of Zn therein to treat the tube with the vapour of Zn and processed with bender. On the other hand, a brazing sheet with a thickness of 0.16 mm and a width of 22 mm, which was cladded by 10% with the brazing material equivalent to JIS 4343 onto both sides of the core material of Al alloy equivalent to JIS 3003, was corrugated in a height of 20 mm to form the fin. This was assembled with said tube having been bent and washed. Then, the noncorrosive fluoride flux, which is said hitherto the pit corrosion resistance being poor, was coated at 3% concentration and, after drying, the brazing was performed for 3 minutes at 600° C. in $N_2$ gas to manufacture the condenser.

Of this, CASS test (720 hours) was conducted to determine the maximum depth of pitting corrosion generated on the tube and compared with that generated on the brazed article with flux, which has been most excellent hitherto in the pitting corrosion resistance, that is, the tube material of condenser wherein the fin aforementioned was assembled with the tube processed with bender without treating with the vapour of Zn and, after brazed for 3 minutes at 600° C. in the air with chloride flux containing $ZnCl_2$, the residue of flux was removed by washing with hot water, acid pickling and washing with water. As a result, only shallow corrosions below 0.2 mm were generated in each case and one given the treatment of the invention has shown equal corrosion resistance to that of brazed article with flux, which has been most excellent hitherto in the corrosion resistance.

EXAMPLE 19

Using the fin material similar to Example 18 and the tube not treated with the vapour of Zn, the brazing was performed for 3 minutes at 600° C. in the air with chloride flux containing no $ZnCl_2$. This was retained for 10 minutes at 500° C. in the atmospheric furnace of $N_2$ placed the melt of Zn therein to treat with the vapour of Zn and the diffuse layer of Zn was formed all over the condenser. Of this, CASS test (720 hours) was conducted similarly to Example 18 and the maximum depth of pitting corrosion generated on the tube material was determined to compare with that of brazed article with chloride flux containing $ZnCl_2$, which has been most excellent hitherto in the pitting corrosion resistance. As a result, the brazed article most excellent hitherto in the pitting corrosion resistance showed the depth of pitting corrosion of 0.15 mm, whereas one given the treatment of the invention showed the depth of pitting corrosion as shallow as 0.08 mm and the pitting corrosion resistance was excellent.

EXAMPLE 20

A brazing sheet (plate thickness: 0.4 mm, cladding ratio: 10%) cladded with the brazing material equivalent to JIS 4343 onto one side of the core material equivalent to JIS 3003 was converted to a tube (outer size: thickness 2.5 mm, width 13 mm) in which the core material comprising JIS 3003 faced toward inside (water side) by seam welding. Also, a brazing sheet (thickness: 1.6 mm) cladded with the brazing material in a cladding ratio of 7% was processed to make a header (by boring for inserting the tube, providing a flange for attaching the resin tank and providing pawls etc. for caulking). On the other hand, a fin material (plate thickness: 0.1 mm, width 16 mm) equivalent to JIS 3003 was corrugated in a height of 10 mm to form the fin. Said tube, header and fin were assembled, coated with noncorrosive fluoride flux at 5% concentration and, after drying, heated for brazing for 3 minutes at 600° C. in the atmosphere of $N_2$. Successively, the vapour of An generated by melting Zn under heat at 500° C. in a different furnace was introduced to the brazing furnace without lowering the temperature making $N_2$ gas as a carrier and the treatment with the vapour of Zn was performed simultaneously with brazing to manufacture the radiator.

Next, a brazing sheet (plate thickness: 0.4 mm) cladded with the brazing material equivalent to JIS 4343 onto one side of the core material equivalent to JIS 3003 (cladding ratio: 10%) and with the skin material equivalent to JIS 7072 being excellent in the corrosion resistance onto the other side (cladding ratio: 10%) was converted to a tube (outer size: thickness 2.5 mm, width 13 mm) in which the core material comprising JIS 7072 faced toward inside (water side) by seam welding. Also, a brazing sheet with a thickness of 1.6 mm cladded similarly with the skin material equivalent to JIS 7072 and the brazing material equivalent to JIS 4343 was processed to make a header. Furthermore, a fin material (thickness: 0.1 mm, width: 16 mm) equivalent to JIS 3003 was corrugated in a height of 10 mm to manufacture the fin. These tube, header and fin were assembled and brazed as described above. At this time, one set was treated with the vapour of Zn simultaneously with brazing and other one set was not treated with the vapour of Zn.

To three sets of radiators thus manufactured, tanks made of resin were attached respectively and the corrosion test was conducted by allowing a corrosive solution added with 10 ppm of $Cu^{2+}$ to the tap water to circulate internally. The test was conducted for 3 months making 8 hours at 80° C. and 16 hours at room temperature as 1 cycle. The flow velocity of corrosive solution was made 40 liters/min. After the completion of test, the maximum depth of pitting corrosion of the tube material of radiator given the treatment of the invention was 0.07 mm in either case, whereas, with one not given the treatment with the vapour of Zn (used the sking material equivalent to JIS 7072 being excellent in the corrosion resistance), the maximum depth of pitting corrosion was 0.15 mm. From this, it can be understood that the pitting corrosion resistance is improved remarkably by treating with the vapour of Zn.

Examples 21 through 31 and Comparative examples 10 through 16 An Al plate with a thickness of 1 mm, a width of 50 mm and a length of 100 mm was brazed in the NB brazing furnace and, at the same time, the concentrating treatment of Zn to the surface of Al plate was carried out. For the NB brazing furnace, a muffle type furnace with a height of 400 mm, a width of 600 mm, a length of 2000 mm and a volume of 480 liters provided the preheating chamber and the heating chamber therein was used. The Al plate was coated with the fluoride noncorrosive flux at 5% concentration. Ten sheets of these plates were hung down together by jig and fed to the drying furnace heated to 200° C. to evaporate the moisture. These were placed in the preheating chamber heated to 550° C. in the NB brazing furnace. After retained for 5 minutes, they were transferred to the heating chamber heated to 600° C. and retained for 15 minutes, thereby the brazing for 3 minutes at a real temperature of 600° C. was performed. After heating, they were taken out rapidly in the air via the preheating chamber and allowed to cool.

Into the heating chamber of the NB brazing furnace, 240 liters/min of $N_2$ gas were introduced. These were released to outside the furnace via the preheating chamber and the atmosphere inside the furnace was kept so as the dew point and the concentration of oxygen to be at $-35°$ C. and 100 ppm, respectively. On the other hand, Zn was placed in a generating furnace of the vapour of Zn with a height of 200 mm, a width of 300 mm, a length of 500 mm and a volume of 30 liters and molten under heat at 500° C. keeping the atmosphere inside the furnace so as the dew point and the concentration of oxygen to be at $-40°$ to $-30°$ C. and 100 to 300 ppm, respectively, by flowing $N_2$ gas to allow the vapour of Zn to generate. The vapour of Zn generated in this way was introduced into the preheating chamber of the NB brazing furnace via the pipe kept the temperature at 550° C. and the concentrating treatment of Zn was performed to the surface of Al plate simultaneously with NB brazing. At this time, the diffuse behaviour of Zn (surface concentration and depth of diffusion) on the surface of Al when varied the flow rate of $N_2$, the amount of the melt of Zn and the surface area of the melt of Zn in the generating furnace of the vapour of Zn was examined by means of EPMA analysis. The results are shown in Table 3.

Besides, the EPMA analysis was conducted by measuring at five points for each of 10 sheets of Al plates and determining the average value of 50 points.

TABLE 3

| Generating method of vapour of Zn | No. | Weight of Zn (g/l) | Surface of melt of Zn (cm²/l) | Flow rate of $N_2 \times 30$ (l/min) | Dew point (°C.) | Concentration of $O_2$ (ppm) | Situation of diffusion of Zn | |
|---|---|---|---|---|---|---|---|---|
| | | | | | | | Concentration of surface Zn (%) | Depth of diffusion (μm) |
| Method of the invention | 21 | 1 | 0.07 | 0.07 | −20 | 900 | 2.2 | 100 |
| Method of the invention | 22 | 1.5 | 0.15 | 0.1 | −23 | 500 | 3.0 | 105 |
| Method of | 23 | 3 | 0.3 | 0.5 | −28 | 180 | 4.5 | 110 |

TABLE 3-continued

| Generating method of vapour of Zn | No. | Weight of Zn (g/l) | Surface of melt of Zn (cm²/l) | Flow rate of N₂ × 30 (l/min) | Dew point (°C.) | Concentration of O₂ (ppm) | Situation of diffusion of Zn | |
|---|---|---|---|---|---|---|---|---|
| | | | | | | | Concentration of surface Zn (%) | Depth of diffusion (μm) |
| Method of the invention | 24 | 3 | 0.3 | 0.9 | −30 | 150 | 5.0 | 110 |
| Method of the invention | 25 | 5 | 0.1 | 0.15 | −25 | 200 | 2.8 | 100 |
| Method of the invention | 26 | 5 | 1.0 | 0.15 | −25 | 200 | 4.3 | 110 |
| Method of the invention | 27 | 5 | 2.4 | 0.15 | −25 | 200 | 7.7 | 120 |
| Method of the invention | 28 | 7 | 1.0 | 0.3 | −27 | 180 | 5.2 | 110 |
| Method of the invention | 29 | 10 | 0.5 | 0.1 | −23 | 450 | 3.7 | 105 |
| Method of the invention | 30 | 10 | 0.5 | 0.15 | −25 | 200 | 3.9 | 105 |
| Method of the invention | 31 | 10 | 0.5 | 0.7 | −29 | 160 | 5.6 | 115 |
| Comparative method | 10 | 0.5 | 0.15 | 0.15 | −25 | 200 | 0.3 | 75 |
| Comparative method | 11 | 12 | 0.15 | 0.15 | −25 | 200 | 12.5 | 200 |
| Comparative method | 12 | 5 | 0.02 | 0.9 | −30 | 150 | 0.4 | 80 |
| Comparative method | 13 | 5 | 3.0 | 0.15 | −25 | 200 | 9.5 | 150 |
| Comparative method | 14 | 5 | 2.0 | 0.02 | −15 | 300 | 0.5 | 85 |
| Comparative method | 15 | 5 | 0.15 | 1.2 | −30 | 100 | 13.3 | 210 |
| Comparative method | 16 | 1 | 0.07 | 0.07 | −20 | 1300 | 0.3 | 70 |

As evident from Table 3, in the cases of the generation of the vapour of Zn in accordance with the method of the invention Nos. 21 through 31, such diffusion patterns of Zn that the concentration of surface Zn was 2 to 10% and the depth of the diffusion was 100 μm or so were shown. From this, it can be seen that the equal pitting corrosion resistance to that of flux-brazed article excellent in the corrosion resistance is obtained.

On the contrary, in the cases of comparative methods out of the conditions prescribed by the invention, the diffusion patterns of Zn excellent in the pitting corrosion resistance could not be obtained, or there arose a problem that the consumption of Zn became high because of the deep diffusion of Zn. For example, in the cases of comparative method Nos. 10, 12, 14 and 16, sufficient vapour of Zn did not generate and came not to show the diffusion patterns of Zn excellent in the pitting corrosion resistance. Moreover, in the cases of comparative method Nos. 11, 13 and 15, the generation of the vapour of Zn was remarkable and the diffusion became also deep resulting in the problems of high consumption of Zn, deep pitting corrosion, etc.

EXAMPLES 32 through 35

The NB brazing was performed similarly to Example 21. At that time, Zn was placed in the preheating chamber (height: 400 mm, width: 600 mm, length: 900 mm, volume: 216 liters) to melt and vapourize and the concentrating treatment of Zn was given to the surface of Al plate simultaneously with the preheating of Al plate in the preheating chamber. Then, the situation of the diffusion of Zn was examined similarly to Example 21. As a result, in all cases of the method of the invention Nos. 32 through 35, excellent diffusion patterns of Zn were obtained as shown in Table 4.

TABLE 5

| Generating method of vapour of Zn | No. | Weight of Zn (g/l) | Surface of melt of Zn (cm²/l) | Flow rate of N₂ × 30 (l/min) | Dew point (°C.) | Concentration of O₂ (ppm) | Situation of diffusion of Zn | |
|---|---|---|---|---|---|---|---|---|
| | | | | | | | Concentration of surface Zn (%) | Depth of diffusion (μm) |
| Method of the invention | 32 | 1 | 0.1 | 1.1 | −35 | 150 | 2.5 | 100 |
| Method of the invention | 33 | 3 | 0.5 | 1.1 | −35 | 150 | 3.7 | 100 |
| Method of the invention | 34 | 5 | 1.5 | 1.1 | −35 | 150 | 5.4 | 110 |
| Method of the invention | 35 | 5 | 2.0 | 1.1 | −35 | 150 | 6.9 | 110 |

EXAMPLES 36 and 37

The NB brazing was performed similarly to Example 21. At that time, Zn was placed in the heating chamber (height: 400 mm, width: 600 mm, length: 1100 mm, volume: 246 liters to melt and vapourize and the concentrating treatment of Zn was given to the surface of Al plate simultaneously with the NB brazing of Al plate in the heating chamber. Then, the situation of the diffusion of Zn was examined similarly to Example 21. As a result, in all cases of the method of the invention Nos.

36 and 37, excellent diffusion patterns of Zn were obtained as shown in Table 5.

TABLE 5

| Generating method of vapour of Zn | No. | Weight of Zn (g/l) | Surface of melt of Zn (cm²/l) | Flow rate of N₂ × 30 (l/min) | Dew point (°C.) | Concentration of O₂ (ppm) | Situation of diffusion of Zn | |
|---|---|---|---|---|---|---|---|---|
| | | | | | | | Concentration of surface Zn (%) | Depth of diffusion (μm) |
| Method of the invention | 36 | 1 | 0.3 | 0.9 | −35 | 100 | 4.5 | 80 |
| Method of the invention | 37 | 5 | 0.3 | 0.9 | −35 | 100 | 6.4 | 85 |

POTENTIAL FOR THE INDUSTRIAL USE

As described, in accordance with the invention, when brazing the heat-exchanger requiring the pitting corrosion resistance with noncorrosive flux, the diffusion pattern of Zn excellent in the pitting corrosion resistance can be formed on the Al components simultaneously with the brazing, thereby the working process can be shortened remarkably compared with the zincate treatment before the brazing and thus the manufacturing cost can be reduced. Moreover, by treating with the vapour of Zn without coating with flux onto the tube material and yet at a temperature before the flux flows, it has become possible to prevent the action by which the flux film suppresses the adherence of Zn. Therefore, such a way has been opened as utilizable not only for the condenser core and evaporator core using extruded multihole tube for the tube material but also for the drawn-cup evaporator using brazing sheet for the tube material, the radiator using seam welded (brazing sheet), and the like together with the improvement in the pitting corrosion resistance.

Further, the sacrificial layer of Zn, which improves remarkably the pitting corrosion resistance of Al or Al alloy components with simple facility, can be formed easily and, at the same time, the generation of the vapour of Zn has been made easy to permit the diffusion of Zn simultaneously with brazing in the NB brazing used the fluoride noncorrosive flux. Therefore, the invention exerts extremely remarkable effect industrially.

We claim:

1. A method of manufacturing a heat-exchanger comprising:
    brazing aluminum components of the heat exchanger together using fluoride flux in a heated furnace having an inert gas atmosphere,
    melting and vaporizing Zn in the furnace at a temperature of from 430° to 620°,
    contacting the vaporized Zn with the components simultaneously with said brazing,
    controlling the concentration of oxygen in the furnace to be not more than 1000 ppm,
    controlling the dew point in the furnace to be not more than −30° C.,
    flowing inert gas through the furnace at a rate of one tenth of the volume of the furnace per minute, and
    sizing the surface area of the molten Zn being vaporized to be 0.05 to 2.5 cm² per unit volume (liter) of the furnace.

2. The method according to claim 1, wherein said components include fin material and tube material, further comprising:
    prior to brazing, coating said fin material with the fluoride flux,
    drying the coated fin material,
    assembling the coated fin material with uncoated tube material,
    heating the assembled fin material and tube material for not less than one minute in the presence of vaporized Zn in the inert gas at a temperature lower than a melting point of the fluoride flux and in the range of 430° to 620° C.; and
    thereafter performing said brazing and said simultaneous contacting at a temperature higher than said melting point of the fluoride flux.

3. Method of generating vaporized Zn for concentration of surface Zn on Al components comprising melting and vaporizing Zn in a furnace having an inner volume V liters at a temperature greater than 430° C.,
    flowing N₂ through the furnace at a rate of 0.05 V to 1.0 V liters/min.,
    providing Zn in the furnace to be vaporized in the amount of 1 to 10 g/liter,
    sizing the surface area of the molten Zn to be 0.05 to 2.5 cm²/liter,
    controlling the concentration of oxygen in the furnace to be not more than 1000 ppm, and
    controlling the dew point in the furnace to be not more than −20° C.

* * * * *